Dec. 24, 1968 F. A. BROOKS 3,418,580

VOICE SIGNAL PROCESSING AND PHASE EQUALIZING FOR SSB SYSTEM

Filed Nov. 4, 1964 2 Sheets-Sheet 1

INVENTOR.
FRED A. BROOKS
BY Harry A. Herbert Jr
and George Fine
ATTORNEYS

INVENTOR.
FRED A. BROOKS
BY Harry A. Herbert Jr
and George Fine
ATTORNEYS

United States Patent Office 3,418,580

Patented Dec. 24, 1968

3,418,580

VOICE SIGNAL PROCESSING AND PHASE EQUALIZING FOR SSB SYSTEM

Fred A. Brooks, Lexington, Mass., assignor to the United States of America as represented by the Secretary of the Air Force Filed Nov. 4, 1964, Ser. No. 409,035

4 Claims. (Cl. 325—137)

ABSTRACT OF THE DISCLOSURE

A system for voice signal processing to obtain improved carrier transmission performance by obtaining a reduced peak to RMS ratio from a voice signal and maintaining that ratio. The signal with a reduced peak ratio permits operating the signal at increased volume to obtain an improved signal to noise performance.

This invention relates to a system for voice signal processing to obtain improved carrier transmission performance.

All transmission circuits have limited peak voltage and power capacities. Signal voltages applied must not exceed this capacity for more than a small proportion of the time for satisfactory performance. If the transmitted signals have high peak to RMS voltage ratios a large peak factor allowance over and above the RMS power must be made. The peak factor allowance required decreases with the number of channels. For 50 or less channels 10 db or more peak load capacity is required. If the individual channel peak factor is reduced the load capacity required is reduced. The peak voltage of a base and voice signal can be reduced by many db before the articulation performance of voice circuits are degraded. The distortion introduced into the signal for acceptable limiting is modest and any reasonable amount of peak limiting can be obtained with the same distortion by the application of feedback to the limiting device.

In a frequency division multiplex terminals for speech transmission the envelope of the single sideband signal in each channel band filter output is not an exact replica of the baseband signal translated to upper or lower sideband of a carrier. The sideband frequency components areamplitude distorted and shifted in phase by the transmitting band filter and a quadrature component may be introduced. Thus, if the incoming signal is severely limited to establish a wave form with a minimum peak to root mean square (RMS) ratio, in selecting a single sideband in the modulation process the wave form will be distorted which may be corrected by amplitude and phase equalization and reducing the quadrature component by preshaping the applied signal.

It has been observed that when a voice signal wave is severely limited to reduce its peak to RMS voltage ratio, the action of a normal modulator band filter distortion is to restore some of the peak voltages so that, the ratio is about the same as it was before limiting. This means that a peak limited signal transmitted through a channel modulator and band filter with its distortions will negate most of the peak limiting. In order to maintain a reduced peak to RMS voltage ratio in a single sideband system the phase distortion in each channel, which is the principal cause of wave distortion in a normal system should be phase equalized. In a multichannel system made up of equalized channels the sum of voltages will also maintain a minimum peak to RMS ratio. A switched band filter utilized in one embodiment of my invention, with built in phase equalization and developed by RCA has the amplitude and phase characteristic required to maintain a minimum peak to RMS ratio in each channel and for the complete multiplex.

The effect of the quadrature component in the sideband signal is reduced by preshaping the baseband signal to remove both low and high frequencies and reduce the band to that of the channel filter.

The power capacity in common amplifiers of carrier systems is given in an article on load rating theory entitled "Load Rating Theory for Multichannel Amplifiers" by H. D. Holbrook and also described by J. T. Dixon, in Bell System Tech. Journal, vol. 18, pp. 624–644, 1939. The load capacity required for no peak clipping, modest peak clipping and controlled volume applied to an idealized system of various numbers of channels are shown. The difference between the RMS power required and the peak capacity taken from the reference for the three conditions of applied signals is shown in FIGURE 4 herewith. The curve without peak clipping approaches the RMS curve asymptotically for a large number of channels. With modest peak clipping or constant volume signals the curves approach the RMS curve for a smaller number of channels.

If the effect of both regulated volume and peak limiting were combined and maximum peak clipping applied the required load capacity would approach the RMS curve for a much smaller number of channels. With a large amount of peak clipping the applied voltage approximates a series of square top waves with random length and phase. The peak load required for a single channel will be reduced by the amount of peak clipping introduced into the signal and for complete clipping the load capacity is equal to the RMS. Many channels treated in the same way would tend to follow the RMS addition curve and about all of the excess load capacity previously allowed could be used for useful load.

The permissible peak limiting depends upon the distortion of the limiter either at the base band or in a channel modulator. The distortion can be reduced and the permissible limiting increased by the application of feedback to the limiter. The normal third order modulation in limiting devices would require a modest improvement to permit large amounts of peak limiting. An improvement of about six db would permit almost unlimited peak limiting.

With either the aforementioned RCA switchband filter system or preequalized modulator band filter channels, the sideband envelopes will be substantially free of distortion, as aforementioned. The sum of the signals from all active channels at the common output will have a minimum peak to RMS ratio which may approach unity. This signal can then be transmitted over common high frequency circuits at a higher volume than the unregulated signal by the reduction made in the peak to RMS voltage ratio at the multiplex output.

In accordance with the present invention there is provided means of obtaining a reduced peak to RMS ratio from a voice signal and maintaining that ratio in signal sideband multiplex terminals. Means are shown and described for regulating the applied volume of voice signals and shaping the signal to secure the desired wave form for transmission. The regulated and limited signal can be applied to either a preequalized channel modulator and band filter of a standard multiplex or a channel of a system with built in phase and amplitude equalization such as RCA's switchband system. When one or more channels in common multiplex are similarly equipped active channels of the combined signal will also have a minimum ratio. The signal with a reduced peak ratio permits operating the signal at increased volume to obtain an improved signal to noise performance with a given power amplifier.

An object of the present invention is to provide a system for voice signal processing to obtain improved carrier transmission performance.

Another object of the present invention is to provide a system for obtaining a reduced peak to RMS ratio from a voice signal and maintaining that ratio in single sideband multiplex terminals.

In the accompanying specification, I shall describe, and in the annexed drawings, show what is at present considered preferred embodiments of my present invention. It is, however, to be clearly understood that I do not wish to be limited to the exact details herein shown and described as they are for purposes of illustration only, inasmuch as changes therein may be made without the exercise of invention and within the true spirit and scope of the claims hereto appended.

Figure 1:
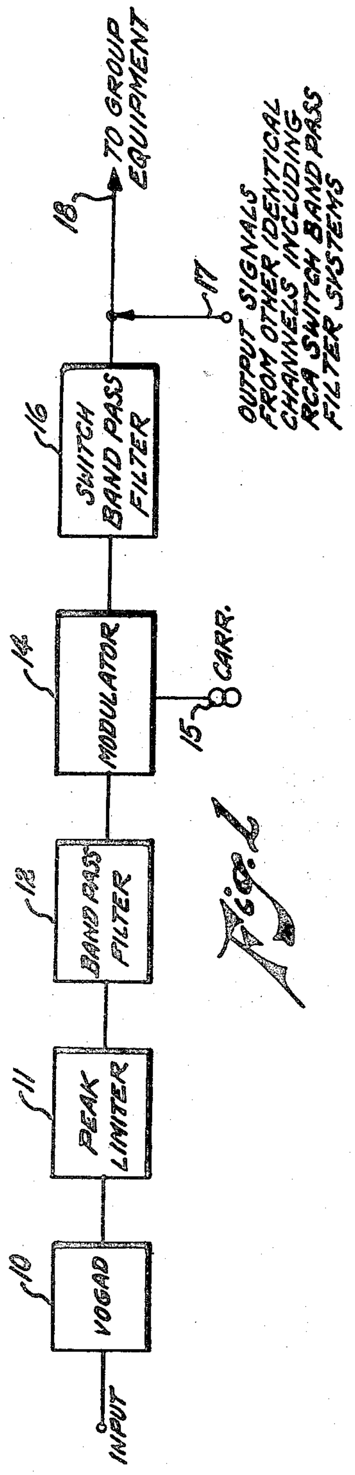
FIGURE 1 shows a first embodiment of the present invention to obtain minimum maximum peak to RMS voltage ratio for phase equalizer carrier channels.

Now referring to the system illustrated in FIGURE 1, there is shown a single channel arrangement of components in combination required to obtain a minimum peak to RMS voltage ratio for application to phase equalized channels. The input to Vogad 10 is an electrical signal such as speech. Vogad 10 is an audio amplifier which is regulated to a constant volume at the output thereof and is a voice operated gain-adjusting device such as described in Western Electric Instruction Bulletin No. 1116 and entitled A–2 Vogad, and Western Electric Instruction Bulletin No. 1119 entitled B–2 Vogad. As described in the aforementioned references and also known in the art, Vogad operates on the comparatively long time average power in the applied voice signal to make all talkers deliver approximately the same mean power while leaving the ratio of peak to RMS voltage substantially the same. This constant volume, as universally understood in the art, means the new power is fixed. Thus, a base band talker signal is regulated to a constant volume and then passed through peak limiter 11. Peak limiter 11 is adjusted at a predetermined magnitude. Thus, the effect of both regulated volume and peak limiting are combined.

After peak limiting, the talker signal passes through band-pass filter 12 to remove both low and high frequencies. In this instance filter 12 pass frequencies between 0.2 to 3.5 kc. Thus, the effect of the quadrature component in a sideband signal is reduced by preshaping the base band signal to remove both low and high frequencies and reduce the band to that of the channel filter.

Modulator 14, having a carrier inserted therein by way of generator 15 receives the regulated, limited and selected signal and then modulates it to provide the aforementioned sidebands. The modulated signal is passed through switch band filter system 16 which provides built in phase equalization and includes amplitude and phase characteristics required to maintain a minimum peak to RMS ratio in each channel. The output signal is combined with output signals 17 from other identical channels except displaced in frequency processed to obtain the sum of the sideband voltages for application for transmission purposes to group equipment at terminal 18. The voltages from all active channels will maintain a minimum to peak to RMS ratio. Switchband filter system may be of the RCA type such as described at page 448 of "Lectures On Communication System Theory" by Elie J. Baghdady published by McGraw-Hill Book Co., also described at page 1703 of Pro. IRE, vol. 44, 1956 entitled, "A Third Method of Generating and Detection of Single Sideband Systems."

Figure 2:
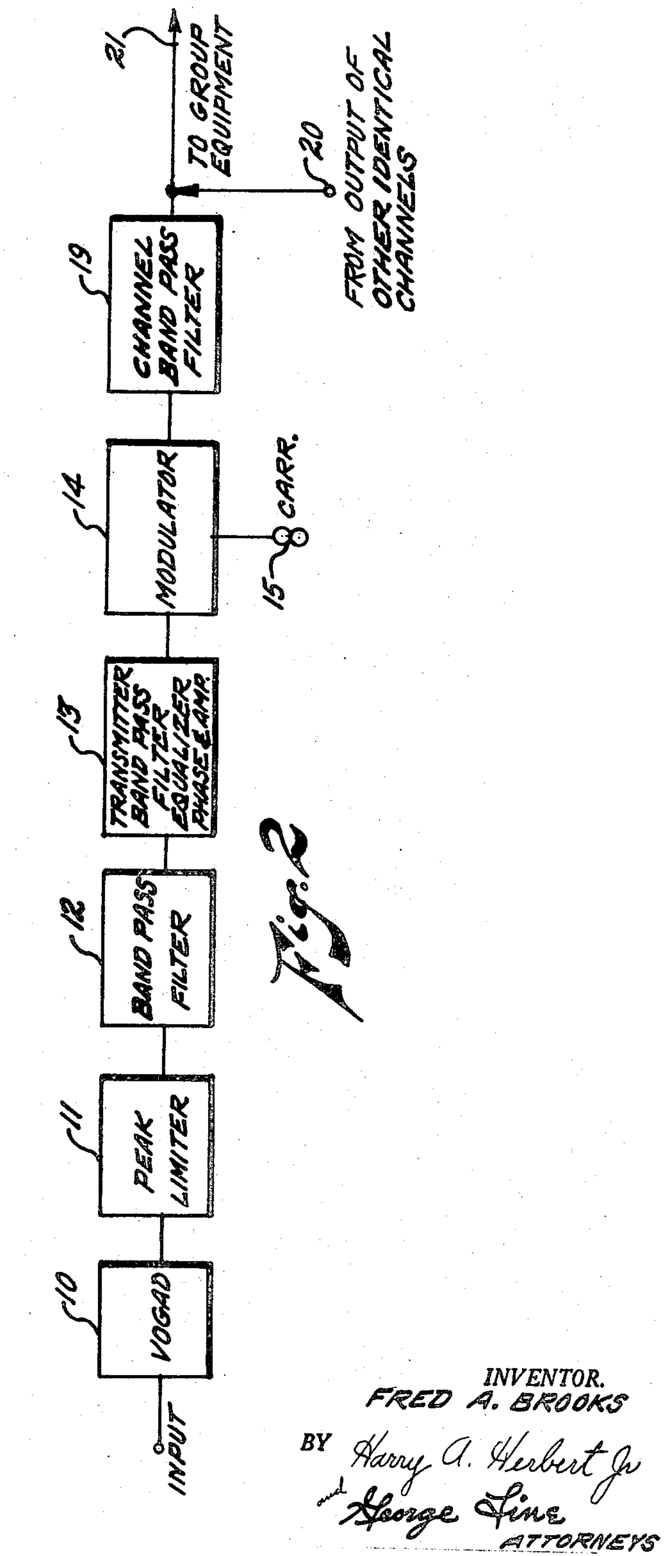
FIGURE 2 shows a second embodiment to obtain minimum maximum peak to RMS voltage ratio for normal unequalized carrier modulators.

The combination of components required for constant volume minimum peak to RMS ratio for operation over a normal standard channel of a carrier multiplex is shown in FIGURE 2 assuming external limiting. This system has the same arrangement of Vogad 10, peak limiter 11, and band-pass filter 12 as shown and described for FIGURE 1 but phase equalizer 13 is required to preequalize the distortion introduced in the modulation process both in phase and amplitude. Phase equalizer 13 may be a phase shifting network as described at pages 136–141, vol. 19, of Radiation Laboratory Series published by McGraw-Hill Book Co. in 1953.

Generally the principal distortion is due to the phase shift which takes place in the band filter when a single sideband is selected from the double sideband in the modulator.

In order to preequalize the aforementioned distortion, there is provided equalizer 13 which supplies a predetermined phase correction. Modulator 14 receives a carrier signal from generator 15 and also the preequalized signal from equalizer 13. The modulated signal passes through channel band-pass filter 19. Terminal 20 receives output signals from other channels identical except displaced in frequency to the one shown in FIGURE 2 for application for transmission purposes to the group equipment at terminal 21.

The combined signal from all active channels as shown in either FIGURES 1 or 2 will add in a broadband circuit and maintain the applied wave form through any subsequent broadband frequency translation or amplification. The summed signal can be transmitted through translation and amplification at a higher power than nontreated signals for the same number of channels.

Figures 3, 4:
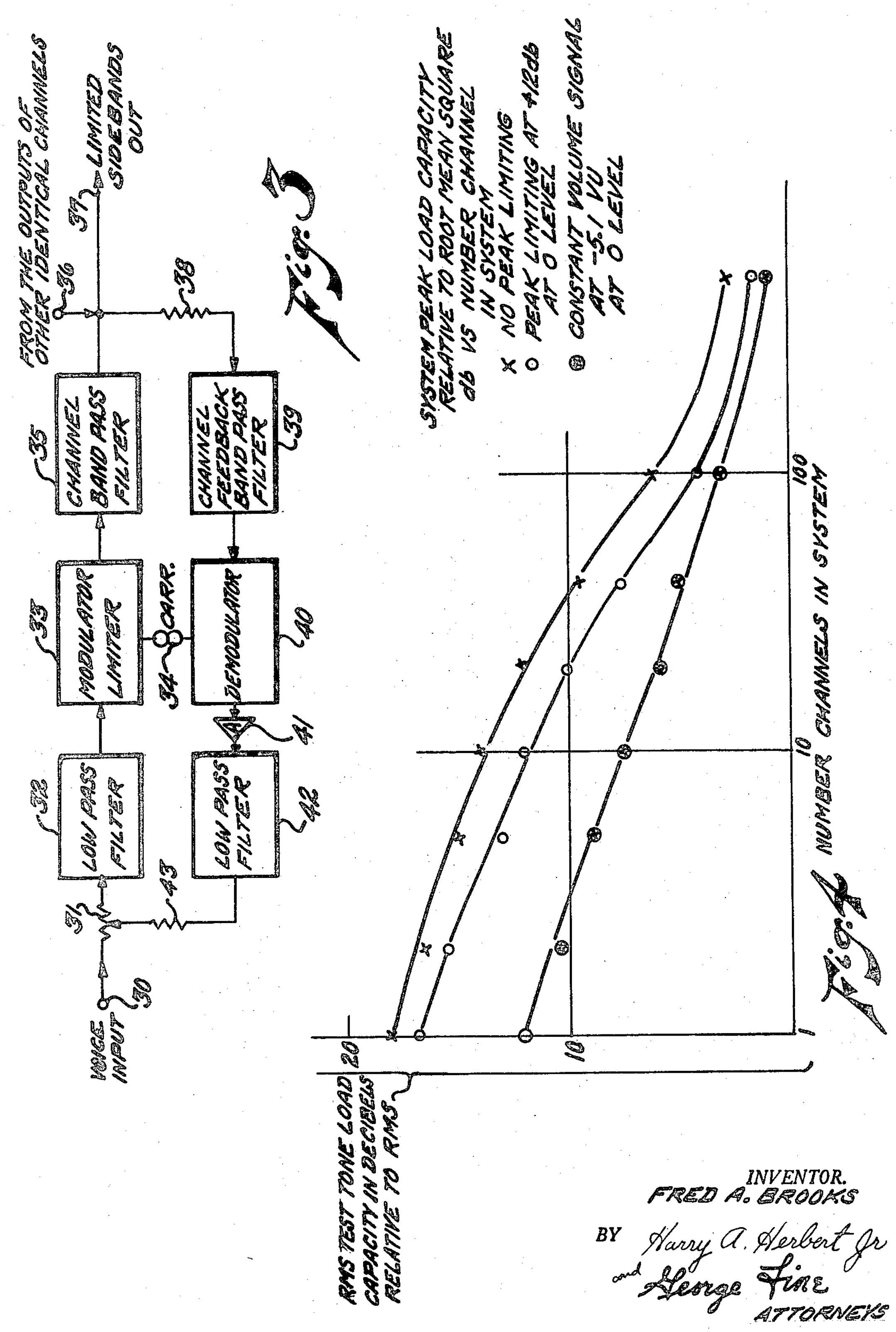
FIGURE 3 shows a third embodiment of the present invention including feedback.
FIGURE 4 include curves showing the load capacity for no peak clipping, modest peak clipping and controlled volume applied to a system of various numbers of channels.

Now referring to FIGURE 3, there is shown input terminal 30 receiving an input signal such as speech which is fed to low pass filter 32 by way of potentiometer 31. Modulator-limiter 33 receives simultaneously a carrier signal from generator 34 and the filtered speech signal. The modulated signal is fed through channel band-pass filter 35 which is then fed back to channel feedback band-pass filter 39 by way of resistor 38. Demodulator 40 receives simultaneously a carrier signal from generator 34 and a signal from filter 39. The demodulated signal is fed to low pass filter 42 by way of amplifier 41. The output signal from filter 42 is fed by way of resistor 43 to the movable portion of potentiometer 31 to add the feedback signal to the input signal. Terminal 36 receives output signals from other channels identical except displaced in frequency to the one previously described for FIGURE 3. At terminal 37, there is provided limited sideband output for transmission.

It is to be noted that the permissible peak limiting depends upon the distortion of the limiter either at the base band or in a channel modulator. The distortion is reduced and the permissible limiting increased by application of feedback.

While, in accordance with the provisions of the statutes, I have illustrated and described the best forms of the invention now known to me, it will be apparent to those skilled in the art that changes may be made in the form of the system disclosed without departing from the spirit of the invention as set forth in the appended claims, and that in some cases certain features of the invention may sometimes be used to advantage without a corresponding use of other features.

Having now described by invention, what I claim as new and desire to secure by Letters Patent, is as follows:

1. A voice signal processing system to obtain improved carrier transmission comprising a channel including means to amplify an input voice signal to provide a predetermined constant volume voice signal output, said constant volume output voice signal having a fixed mean power while retaining the ratio of peak to root mean square voltage substantially the same as said input voice signal, means to peak limit said constant volume output voice signal at a predetermined magnitude to provide a preselected peak to root mean square voltage ratio, means to shape by filtering said peak limited signals to remove both predetermined low and high frequencies to reduce the effect of subsequent quadrature components and also to reduce the bandwidth, means to modulate a carrier signal with said filtered signal to provide sidebands, and means to phase equalize and filter said modulated signal to maintain said preselected peak to root mean square voltage ratio, said filter having substantially the same bandwidth as said shaping means and also operating to select a sideband signal as an output signal of said channel.

2. A voice signal processing system to obtain improved carrier transmission comprising a multiplicity of channels, each channel including means to amplify an input voice signal to provide a predetermined constant volume voice signal output, said constant volume output voice signal having a fixed mean power while retaining the ratio of peak to root mean square voltage substantially the same as said input voice signal, means to peak limit said constant volume output voice signal at a predetermined magnitude to provide a preselected peak to root mean square voltage ratio, means to shape by filtering said peak limited signals to remove both predetermined low and high frequencies to reduce the effect of subsequent quadrature components and also to reduce the bandwidth, means to modulate a carrier signal with said filtered signal to provide sidebands, and means to phase equalize and filter said modulated signal to maintain said preselected peak to root mean square voltage ratio, said filter having substantially the same bandwidth as said shaping means and also operating to select a sideband signal as an output signal of said channel, all of the output signals from said channels being combined for purposes of transmission.

3. A voice signal processing system to obtain improved carrier transmission comprising a channel including means to amplify an input voice signal to provide a predetermined constant volume voice signal output, said constant volume voice signal having a fixed mean power while retaining the peak to root mean square voltage ratio substantially the same as said input voice signal, means to peak limit said constant volume voice signal at a predetermined magnitude to provide a preselected peak to root mean square voltage ratio, means to shape by filtering said peak limited signal to remove both predetermined low and high frequencies to reduce the effect of subsequent quadrature components and also to reduce the bandwidth, means to phase equalize said shaped signal to provide a predetermined phase correction, means to modulate a carrier with said phase equalized signal to provide sidebands, and means to filter the output of said modulator to select a sideband for the channel output signal, said filter having substantially the same bandwidth as said shaping means.

4. A voice signal processing system to obtain improved carrier transmission comprising a multiplicity of channels, each channel including means to amplify an input voice signal to provide a predetermined constant volume voice signal output, said constant volume voice signal having a fixed mean power while retaining the peak to root mean square voltage ratio substantially the same as said input voice signal, means to peak limit said constant volume voice signal at a predetermined magnitude to provide a preselected peak to root mean square voltage ratio, means to shape by filtering said peak limited signal to remove both predetermined low and high frequencies to reduce the effect of subsequent quadrature components and also to reduce the bandwidth, means to phase equalize said shaped signal to provide a predetermined phase correction, means to modulate a carrier with said phase equalized signal to provide sidebands, and means to filter the output of said modulator to select a sideband for the channel output signal, said filter having substantially the same bandwidth or said shaping means, all of the output signals from said multiplicity of channels being combined prior to transmission thereof.

References Cited

UNITED STATES PATENTS

| | | | |
|---|---|---|---|
| 2,285,085 | 6/1942 | Hagen | 325—65 X |
| 3,060,389 | 10/1962 | Kahn | 332—38 |
| 3,085,203 | 4/1963 | Logan et al. | 325—137 |
| 3,089,920 | 5/1963 | Law | 179—15 |
| 3,231,686 | 1/1966 | Hueber | 179—1 X |

ROBERT L. GRIFFIN, *Primary Examiner.*

B. V. SAFOUREK, *Assistant Examiner.*

U.S. Cl. X.R.

325—159; 343—207